(12) United States Patent
Griffith et al.

(10) Patent No.: US 7,259,130 B2
(45) Date of Patent: Aug. 21, 2007

(54) SET-ON DEMAND, ESTER-BASED WELLBORE FLUIDS AND METHODS OF USING THE SAME

(75) Inventors: James E. Griffith, Loco, OK (US); Ron D. Nida, Fulshear, TX (US); John L. Dennis, Jr., Marlow, OK (US)

(73) Assignee: Halliburton Energy Services, Inc., Duncan, OK (US)

( * ) Notice: Subject to any disclaimer, the term of this patent is extended or adjusted under 35 U.S.C. 154(b) by 492 days.

(21) Appl. No.: 10/910,103

(22) Filed: Aug. 3, 2004

(65) Prior Publication Data
US 2006/0030494 A1 Feb. 9, 2006

(51) Int. Cl.
*C09K 8/40* (2006.01)
(52) U.S. Cl. .............. 507/267; 507/265; 507/269
(58) Field of Classification Search .......... None
See application file for complete search history.

(56) References Cited

U.S. PATENT DOCUMENTS

| | | | |
|---|---|---|---|
| 5,194,422 A | 3/1993 | Mueller et al. | 507/136 |
| 5,232,910 A | 8/1993 | Mueller et al. | 507/138 |
| 5,252,554 A | 10/1993 | Mueller et al. | 507/138 |
| 5,295,543 A | 3/1994 | Terry et al. | 166/293 |
| 5,318,954 A | 6/1994 | Mueller et al. | 507/138 |
| 5,318,956 A | 6/1994 | Mueller et al. | 507/139 |
| 5,327,968 A | 7/1994 | Onan et al. | 166/293 |
| 5,332,041 A | 7/1994 | Onan et al. | 166/295 |
| 5,346,012 A | 9/1994 | Heathman et al. | 166/293 |
| 5,348,938 A | 9/1994 | Mueller et al. | 507/139 |
| 5,355,954 A | 10/1994 | Onan et al. | 166/292 |
| 5,398,758 A | 3/1995 | Onan et al. | 166/292 |
| 5,403,822 A * | 4/1995 | Mueller et al. | 507/138 |
| 5,423,381 A * | 6/1995 | Surles et al. | 166/295 |
| 5,441,927 A | 8/1995 | Mueller et al. | 507/138 |
| 5,618,780 A | 4/1997 | Argillier et al. | 508/503 |
| 5,711,383 A | 1/1998 | Terry et al. | 175/72 |
| 6,138,759 A | 10/2000 | Chatterji et al. | 166/293 |
| 6,315,042 B1 | 11/2001 | Griffith et al. | 166/291 |
| 6,524,384 B2 | 2/2003 | Griffith et al. | 106/705 |
| 6,666,268 B2 | 12/2003 | Griffith et al. | 166/292 |
| 6,668,929 B2 | 12/2003 | Griffith et al. | 166/292 |
| 6,716,282 B2 | 4/2004 | Griffith et al. | 106/705 |
| 2002/0035041 A1 | 3/2002 | Griffith et al. | 507/200 |
| 2003/0036484 A1 | 2/2003 | Kirsner et al. | 507/118 |
| 2003/0064897 A1* | 4/2003 | Kirsner et al. | 507/100 |
| 2003/0116065 A1 | 6/2003 | Griffith et al. | 106/705 |
| 2003/0121456 A1 | 7/2003 | Griffith et al. | 106/724 |
| 2003/0121660 A1* | 7/2003 | Griffith et al. | 166/292 |
| 2003/0144153 A1 | 7/2003 | Kirsner et al. | 507/100 |
| 2004/0043905 A1 | 3/2004 | Miller et al. | 507/100 |
| 2004/0082483 A1 | 4/2004 | Mueller et al. | 507/100 |
| 2004/0171499 A1* | 9/2004 | Ravi et al. | 507/200 |

FOREIGN PATENT DOCUMENTS

WO WO2004/040333 A2 5/2004

OTHER PUBLICATIONS

Halliburton brochure entitled "Accolade™ Drilling Fluid Exceeds New GOM Environmental Standards and Boots Performance" dated 2002.
Halliburton brochure entitled "Hi-Dense® Weight Additives" dated 1998.
Halliburton brochure entitled "MICROMAX Weight Additive" dated 1999.
SPE 77751 entitled "Use of Settable Spotting Fluid Improves Expandable Casing Process—Case History," by Oladele Owoeye et al., dated 2002.
Paper entitled "Practices For Providing Zonal Isolation In Conjunction With Expandable Casing Jobs—Case Histories," by Tom Sanders et al., dated 2003.
Paper entitled "Deepwater Cementing Challenges—an Overview of Offshore Brazil, Gulf of Mexico, and West Africa," by George Fuller et al., 2000.

* cited by examiner

*Primary Examiner*—Robert Sellers
(74) *Attorney, Agent, or Firm*—Craig W. Roddy; Conley Rose

(57) ABSTRACT

Methods of servicing a wellbore in contact with a subterranean formation include passing an ester-based fluid into the wellbore and reducing a temperature of the ester-based fluid by an amount effective to cause the ester-based fluid to set, e.g., by from about 10° F. to about 20° F. The ester-based fluid includes a water in ester-based oil emulsion, a pH controlling additive, e.g., hydrated lime, in the water-phase, and an emulsifier to stabilize the pH controlling additive. Cooling the ester-based fluid causes the emulsion to destabilize, resulting in the release of the pH controlling additive. This release raises pH of the ester-based fluid by an effective amount to cause it to set. Wellbore servicing fluids comprising the foregoing ester-based fluid may be employed as environmentally friendly sealants or spotting fluids in wellbores.

35 Claims, No Drawings

SET-ON DEMAND, ESTER-BASED WELLBORE FLUIDS AND METHODS OF USING THE SAME

FIELD OF THE INVENTION

This invention generally relates to servicing a wellbore. More specifically, the invention relates to ester-based wellbore servicing fluids that set on-demand by lowering their temperature and methods of using such fluids to service a wellbore.

BACKGROUND OF THE INVENTION

Natural resources such as gas, oil, and water residing in a subterranean formation or zone are usually recovered by drilling a wellbore down to the subterranean formation while circulating a drilling fluid through the drill pipe and the drill bit and upwardly through the wellbore to the surface. The drilling fluid serves to lubricate the drill bit and carry drill cuttings back to the surface. After the wellbore is drilled to the desired depth, the drill pipe and drill bit are typically withdrawn from the wellbore while the drilling fluid is left in the wellbore to provide hydrostatic pressure on the formation penetrated by the wellbore and thereby prevent formation fluids from flowing into the wellbore.

The next operation in constructing the wellbore usually involves running a string of pipe, e.g., casing, in the wellbore. During this operation, the drilling fluid may remain relatively static in the wellbore for up to 2 weeks, depending on the depth of the wellbore and the difficulty in running the string of pipe in the wellbore. While drilling fluids do not set into hard masses, they do increase in gel strength over time when they are static. As such, the gel strength of the drilling fluid may build up during this period of time. Next, primary cementing is typically performed whereby a cement slurry is pumped down through the string of pipe and into the annulus between the string of pipe and the walls of the wellbore to allow the cement slurry to set into a hard mass (i.e., sheath), and thereby seal the annulus. The cement slurry ideally displaces the drilling fluid from the annulus. However, if the drilling fluid has developed gel strength, portions of the drilling fluid are bypassed by the cement slurry such that areas of the annulus contain drilling fluid rather than the preferable cement slurry. Since the drilling fluid is not settable, complete zonal isolation of the subterranean formation is not achieved, and formation fluids can undesirably flow into and through the wellbore.

To overcome the problems associated with incomplete drilling fluid displacement, so-called settable spotting fluids have been developed to displace drilling fluids from wellbores prior to primary cementing. They have rheological properties to provide for such displacement even if the drilling fluids have relatively high gel strengths. Further, they typically can set over time into a rigid mass having compressive strength, thereby isolating subterranean formations even if the settable spotting fluids are bypassed during primary cementing.

Traditional settable spotting fluids (SSFs) are water-based fluids comprising blast furnace slag, which is the blast furnace by-product formed in the production of cast iron. Such water-based SSFs are incompatible with oil-based drilling fluids and can occasionally cause hole-stability problems or damage to the permeability of producing subterranean formations. Further, the slag-containing SSFs are limited to wellbores having bottomhole static temperatures (BHSTs) of 90° F. or less, i.e., the temperatures at which they slowly set. Further, the slag-containing SSFs prematurely set if they become mixed with cement. To prevent such premature setting, a strong set retarder is typically added to the SSF, and a spacer fluid is commonly inserted between the SSF and the cement slurry.

Oil-based SSFs have been developed that can be used in wellbores drilled with oil-based fluids and that avoid the problems of the water-based SSF's described above. However, such oil-based SSF's contain hydrocarbons that are detrimental to the environment. A need therefore exists for an environmentally friendly SSF that can be used in wellbores having BHSTs greater than 90° F. and that do not prematurely set when exposed to cement.

SUMMARY OF THE INVENTION

In an embodiment, methods of servicing a wellbore in contact with a subterranean formation include passing an ester-based fluid into the wellbore and reducing a temperature of the ester-based fluid by an amount effective to cause the ester-based fluid to set. The amount by which the temperature is reduced may be in a range of from about 10° F. to about 20° F. below a maximum temperature of the ester-based fluid in the wellbore. The ester-based fluid may be cooled by passing a coolant, e.g., a drilling fluid, into the wellbore, or alternatively, by causing it to react endothermically downhole. Cooling the ester-based fluid causes the emulsion to destabilize, resulting in the release of a pH controlling additive. This release increases the pH of the ester-based fluid by an effective amount to cause it to set.

In an embodiment, ester-based fluids are capable of setting upon being cooled by a predetermined amount, i.e., about 10° F. to 20° F. below their maximum temperature in a wellbore. The ester-based fluids comprise water in an ester-based oil emulsion. The ester-based fluids also include a pH controlling additive such as hydrated lime in the water-phase and an emulsifier to stabilize the pH controlling additive. Wellbore servicing fluids comprising the foregoing ester-based fluids may be employed as environmentally friendly sealants or spotting fluids in wellbores.

DETAILED DESCRIPTION OF THE PREFERRED EMBODIMENTS

Wellbore servicing fluids comprise an ester-based fluid that is capable of setting into a solid mass upon being cooled slightly, i.e., from about 10° F. to about 20° F. below a maximum temperature of the ester-based fluid in a wellbore, provided that a maximum temperature of the wellbore is less than about 240° F. The ester-based fluid usually sets within 10 minutes of cooling it. Thus, such wellbore servicing fluids quickly set-on demand by cooling them to the appropriate temperature. As used herein, "wellbore servicing fluid" refers to a fluid used in servicing a wellbore that penetrates a subterranean formation, such as a sealant composition for sealing the annulus of the wellbore in primary or secondary cementing, a sealant composition for sealing an expandable casing, or a settable spotting fluid for displacing a drilling fluid from the wellbore and improving zonal isolation of the formation. It is understood that "subterranean formation" encompasses both areas below exposed earth or areas below earth covered by water such as sea or ocean water.

The ester-based fluid may comprise an emulsion of water droplets dispersed in an ester-based oil. The water contained in the emulsion may comprise, for example, fresh water, unsaturated saltwater, saturated saltwater such as brines and seawater, or combinations thereof. The amount of water present in the emulsion may range from about 5% to about 45% by weight of the emulsion, preferably from about 20% to about 40%. Examples of suitable ester-based oils for use in the emulsion include ACCOLADE fluid and PETROFREE fluid commercially available from Halliburton Energy Services, Inc., BIO-GREEN fluid commercially available from Baker Hughes, Inc., and combinations thereof. Examples of suitable ester-based oils are the ester blends comprising isomerized and/or internal olefins disclosed in U.S. Pat. App. Pub. No. 2003/0064897 (U.S. Pat No. 6,887,832), entitled "Method of Formulating and Using a Drilling Mud with Fragile Gels", and the esters of monofunctional alcohols comprising from 2 to 12 carbon atoms, and esters derived from monounsaturated or polyunsaturated fatty acids having from 16 to 24 carbon atoms disclosed in U.S. Pat. No. 5,403,822, entitled "Esters of Carboxylic Acids of Medium Chain-length as a Component of the Oil Phase in Invert Drilling Muds", each of which is incorporated by reference herein in its entirety. Such ester-based oils are environmentally compliant and biodegradable. As such, there is no need to be concerned that the use of such ester-based fluids in a wellbore would contaminate subsurface soil and water. The amount of ester-based oil present in the emulsion may range from about 50% to about 90% by volume of the emulsion, preferably from about 60% to about 80%. The ester-based fluid may further comprise a pH controlling additive in the water-phase for raising the pH of the ester-based oil when the fluid is subjected to cooling. As used herein, "pH controlling additive" refers to a basic substance having a pH of from about 9 to about 14. Examples of suitable pH controlling additives comprise hydrated lime ($Ca(OH)_2$), soda ash ($Na_2CO_3$), caustic soda (NaOH solution), alkali metal hydroxides, and combinations thereof, with hydrated lime being preferred due to it being more environmentally friendly. The amount of pH controlling additive present in the ester-based fluid may be in the range of from about 5% to about 40% by weight of the fluid, preferably in the range of from about 5% to about 30%.

The ester-based fluid may additionally include at least one emulsifying surfactant, i.e., an emulsifier, in the water-phase for stabilizing the emulsion until its temperature is lowered in a wellbore. Examples of suitable emulsifiers include AT-50 emulsifier and AT-33 emulsifier, both of which are commercially available from Calgon Corp., and combinations thereof. The amount of the emulsifier present in the ester-based fluid may range from about 1% to about 15% by weight of the fluid, preferably from about 3% to about 10%, and more preferably from about 5% to about 8%.

The ester-based fluid may optionally include an effective amount of a weighting agent to increase its density such that it will subsequently exert a sufficient amount of hydrostatic pressure on a subterranean formation to prevent formation fluids from flowing out of the formation. The density of the ester-based fluid may range from about 11.8 pounds/gallon (ppg) to about 16 ppg, or alternatively from about 12 ppg to about 14 ppg. Examples of suitable weighting agents include barium sulfate, (i.e., barite), iron oxide (i.e., hematite), manganese oxide (i.e., hausmannite), and combinations thereof. Barite and hematite can be purchased from Halliburton Energy Services, Inc. under the tradenames BAROID weighting agent and HIDENSE No. 4 (HD-4) weighting agent. A synthetic hausmannite known as MICROMAX weighting agent is commercially available from Elken Materials Inc. The amount of the weighting agent in the ester-based fluid may be an amount effective to produce the desired density of the ester-based fluid. In an embodiment, the ester-based fluid comprises an effective amount of weighting agent to achieve a fluid density of about 15 ppg.

Another additive that optionally may be included in the ester-based fluid to enhance its ability to set is hydraulic cement, which hardens by reaction with water. Examples of suitable hydraulic cements include Portland cements, pozzolanic cements, gypsum cements, phosphate cements, high alumina content cements, silica cements, high alkalinity cements, and combinations thereof, with Portland cement being preferred. A suitable pozzolanic cement is the FDP-C606-00 cement sold by Halliburton, Inc. An amount of the hydraulic cement present in the ester-based fluid may range from about 3% to about 50% by weight of the fluid, preferably from about 10% to about 30%, and more preferably from about 20% to about 25%.

As deemed appropriate by one skilled in the art, the ester-based fluid may further include additional additives for improving or changing the properties thereof. For example, one or more reactants may be added to the fluid for endothermically reacting downhole, thereby cooling the fluid and causing it to set. Examples of suitable reactants include barium hydroxide octahydrate and ammonium nitrate, which could be carried into the wellbore by the ester-based fluid and reacted downhole.

The foregoing wellbore servicing fluid may be prepared for use in a wellbore by first blending together the pH controlling additive and the water until an aqueous solution is formed. The emulsifier may then be combined with the resulting aqueous solution, followed by the addition of the ester-based oil. The mixture may further be sheared using a relatively high shear rate until a stable water-in-oil emulsion is formed. If desired, the weighting agent and/or the hydraulic cement subsequently may be blended with the emulsion in any order until uniformly dispersed in the emulsion. The wellbore servicing fluid is preferably prepared in this manner on-site near where its use is intended. The wellbore servicing fluid could also be prepared offsite and transported to the location.

Methods of using the previously described wellbore servicing fluid comprising the foregoing ester-based fluid include displacing the wellbore servicing fluid into a wellbore in contact with a subterranean formation. In an embodiment, the wellbore servicing fluid may be pumped down a conduit or string of pipe, e.g., casing, placed in the wellbore and up into the annulus of the wellbore. The initial temperature of the wellbore servicing fluid before displacing it downhole is about equivalent to the temperature of its surrounding atmosphere. As the wellbore servicing fluid passes downhole, its temperature usually increases due to the wellbore temperature increasing. During this time, the ester-based fluid is typically a stabilized water-in-ester-based oil emulsion such that the pH controlling additive is present in the water phase. After the wellbore servicing fluid has reached its desired position in the wellbore, its temperature can be reduced by an amount effective to cause the ester-based fluid to set. In particular, its temperature is lowered about 10° F. to about 20° F. below a maximum temperature of the fluid in the wellbore, thereby causing the emulsion to de-stabilize. As a result of de-stabilizing the emulsion, the pH controlling additive usually separates out of the water phase and contacts the ester-based oil, increasing the pH of the oil from an initial range of from about 8 to about 11 to a final range of from about 9 to about 10. At this higher pH, it is believed that fatty acids in the ester-based fluid cross-link, resulting in the formation of a substantially impermeable, rigid mass. The ester-based fluid usually sets within 10 minutes of first cooling the fluid as long as a maximum temperature of the wellbore is less than about 240° F. Otherwise, the fatty acids could have already been destroyed by exposure to high temperatures.

In an embodiment, the temperature of the ester-based fluid is reduced in the wellbore via external means. That is, a coolant having a temperature lower than that of the ester-based fluid in the wellbore may be circulated through the wellbore such that it passes down the string of pipe and up the annulus to where the wellbore servicing fluid is located. Alternatively, the coolant may be circulated through a conduit, e.g., a drill pipe, disposed above the ester-based fluid in the wellbore. Circulating fluids that may serve as the coolant are compatible with the ester-based fluid, have a relatively high heat transfer coefficient, h, and are inert in the presence of the materials in the wellbore. Examples of suitable coolants include an ester-based drilling fluid.

In an alternative embodiment, the temperature of the ester-based fluid is reduced via internal chemical means. In this embodiment, the ester-based fluid includes one or more reactants that endothermically react downhole.

The ester-based wellbore servicing fluid may be utilized in a wellbore for various purposes. In one embodiment, it may serve as a settable spotting fluid. That is, it may be pumped downhole and into an annulus of a wellbore to displace a drilling fluid therefrom prior to pumping a cement composition into the annulus. The drilling fluid may be an oil-based fluid, for the ester-based fluid is compatible with such drilling fluids. Unlike conventional SSFs, the ester-based fluid does not tend to prematurely set when contacted with cement. As such, set retarders and spacer fluids for separating the ester-based fluid from the cement composition are not required. Using the ester-based fluid in this manner ensures that the drilling fluid does not remain in the annulus during primary cementing despite having a relatively high gel strength. Further, if some of the ester-based fluid remains in the annulus after pumping the cement composition into the annulus, the ester-based fluid may be forced to set as described above while concurrently allowing the cement composition to set. The ester-based fluid and the cement composition thus can be used to jointly seal the annulus such that an adjacent subterranean formation is isolated from the wellbore.

In another embodiment, the ester-based fluid may serve as a sealant in primary cementing or in secondary cementing operations such as squeeze cementing. In this case, the ester-based fluid is pumped into an annulus of a wellbore and forced to set into a hardened sealant, thereby forming a barrier that prevents fluids from flowing into and out of an adjacent subterranean formation. Within the annulus, the ester-based fluid also serves to support a conduit or pipe positioned in the wellbore. Moreover, the ester-based fluid may be strategically positioned in the wellbore to plug a void or crack in the conduit, to plug a void or crack in the hardened sealant residing in the annulus, to plug a relatively small opening known as a microannuli between the hardened sealant and the conduit, and so forth.

In addition, the ester-based fluid may be used for sealing expandable casings as described in Sanders, T. et al., "Practices for Providing Zonal Isolation in Conjunction with Expandable Casing Jobs—Case Histories," paper presented at the High-Tech Wells Conference and Exhibition, Galveston, Tex., 11-13 Feb. 2003, which is incorporated by reference herein in its entirety. Additional disclosure regarding procedures that may be followed to use the ester-based fluid as a sealant in a wellbore are described in U.S. Pat. No. 5,346,012, which is incorporated by reference herein in its entirety.

In yet another embodiment, the ester-based fluid may be employed to improve the stability of a wellbore. In particular, it may be placed across an area of a subterranean formation penetrated by the wellbore that is substantially weak. It may then be forced to set-on demand into a hardened mass that has a compressive strength sufficient to stabilize the formation but not too strong to cause the formation to collapse, e.g., less than about 150 psi. The presence of the resulting hardened mass across the formation increases the integrity of the formation such that it is less likely to collapse into the wellbore under pressure.

EXAMPLES

The invention having been generally described, the following examples are given as particular embodiments of the invention and to demonstrate the practice and advantages hereof. It is understood that the examples are given by way of illustration and are not intended to limit the specification or the claims to follow in any manner.

The following equipment was obtained for the preparation and testing of an ester-based fluid like that disclosed herein:
1. Personal safety equipment
2. Two (2) Waring blender jars at least 1 quart in volume
3. Waring blender base
4. FANN 23D electrical stability meter
5. Weighing scale
6. Five (5) 250 mL glass jars
7. Heated water bath
8. Weighing boats or other small containers
9. Shear-stress sleeve The materials shown in Table 1 below were also obtained for use in the preparation of the ester-based fluid. The amount of each material used is presented in Table 1.

TABLE 1

| Material | Amount |
| --- | --- |
| Ester based oil | 350 cc |
| AT-33 emulsifier | 12 cc |
| AT-50 emulsifier | 1.3 cc |
| Water | 150 cc |
| Hydrated Lime | 80 g |
| FDP-C606-00 cement | 780 g |

The preparation of the ester-based fluid first involved preparing the lime water. First, the water was poured into one Waring blender jar. The hydrated lime was then added to the water, followed by shearing the resulting mixture for 1 minute at 3,000 rpm using the Waring blender. The lime water that was formed was then placed to the side. Next, the base oil was prepared by pouring the ester-based oil into another Waring blender jar, followed by adding the AT-33 emulsifer and the AT-50 emulsifer to the ester-based oil. The resulting mixture was sheared for 5 minutes at 3,000 rpm. The lime water was then added to the base oil containing the emulsifiers. The resulting mixture was sheared for 10 minutes at 12,000 rpm to form an emulsion. The electrical stability (ES value) of the emulsion was then measured to be greater than 350 as desired. The FDP-C606-00 cement were then added to the emulsion. The resulting mixture was sheared 10 minutes at the maximum rpm (about 8,000 to 10,000 rpm) of the Waring blender to form an ester-based fluid suitable for use in a wellbore. The temperature of the fluid increased to within a range of from about 150° F. to about 160° F. as it was being sheared.

The ester-based fluid was then tested as follows in accordance with the American Petroleum Institute (API) Recommended Practice 10B, $22^{nd}$ Edition, December 1997. That is, the fluid was placed in a high-pressure high-temperature (HPHT) cement consistometer, and its temperature and pressure were lowered to a bottom hole pressure and temperature along a temperature and pressure ramp to simulate placing it in a wellbore. The final mixture was then stabilized at the bottomhole conditions by holding its pressure and temperature constant for at least 10 minutes. Then, the final mixture was cooled about 15° F. while its consistency in Beaden units was observed on the HPHT consistometer. Its change in consistency indicated that the ester-based fluid set quickly in response to being cooled slightly.

While preferred embodiments of the invention have been shown and described, modifications thereof can be made by one skilled in the art without departing from the spirit and teachings of the invention. The embodiments described herein are exemplary only, and are not intended to be limiting. Many variations and modifications of the invention disclosed herein are possible and are within the scope of the invention. Use of the term "optionally" with respect to any element of a claim is intended to mean that the subject element is required, or alternatively, is not required. Both alternatives are intended to be within the scope of the claim.

Accordingly, the scope of protection is not limited by the description set out above but is only limited by the claims which follow, that scope including all equivalents of the subject matter of the claims. Each and every claim is incorporated into the specification as an embodiment of the present invention. Thus, the claims are a further description and are an addition to the preferred embodiments of the present invention. The discussion of a reference in the Description of Related Art is not an admission that it is prior art to the present invention, especially any reference that may have a publication date after the priority date of this application. The disclosures of all patents, patent applications, and publications cited herein are hereby incorporated by reference, to the extent that they provide exemplary, procedural or other details supplementary to those set forth herein.

What is claimed is:

1. A method of servicing a wellbore in contact with a subterranean formation, comprising:
   (a) passing an ester-based fluid into the wellbore; and
   (b) reducing a temperature of the ester-based fluid in a range of from about 10° F. to about 20° F. below a maximum temperature of the ester-based fluid in the wellbore to cause the ester-based fluid to set.

2. The method of claim 1, wherein a maximum temperature in the wellbore is less than about 240° F.

3. The method of claim 1, wherein the ester-based fluid sets in less than or equal to about 10 minutes after performing step (b).

4. The method of claim 1, wherein the ester-based fluid is used as a spotting fluid in the wellbore.

5. The method of claim 1, wherein the ester-based fluid is used as a sealant in the wellbore.

6. The method of claim 1, wherein the ester-based fluid comprises an emulsion comprising water in an ester-based oil.

7. The method of claim 1, wherein the ester-based oil comprises esters of monofunctional alcohols comprising 2 to 12 carbons, esters derived from mono or polyunsaturated fatty acids having 16 to 24 ester blends comprising isomerized and/or internal olefins, or combinations thereof.

8. The method of claim 6, wherein the ester-based fluid comprises a pH controlling additive in the water-phase for raising a pH of the ester-based fluid when step (b) is performed.

9. The method of claim 8, wherein the pH is raise from an initial range of from about 8 to about 11 to a final range of from about 9 to about 10.

10. The method of claim 8, wherein the pH controlling additive comprises hydrated lime, soda ash, caustic soda, or combinations thereof.

11. The method of claim 6, wherein the ester-based fluid comprises an emulsifer in the water-phase.

12. The method of claim 1, wherein the ester-based fluid comprises a hydraulic cement.

13. The method of claim 1, wherein the ester-based fluid comprises a weighting agent.

14. The method of claim 1, wherein step (b) comprises passing a coolant compatible with the ester-based fluid into the wellbore.

15. The method of claim 14, wherein the coolant comprises an ester-based drilling fluid.

16. The method of claim 1, wherein the ester-based fluid comprises one or more reactants for cooling the fluid.

17. The method of claim 16, wherein the one or more reactants comprise barium hydroxide octahydrate and ammonium nitrate.

18. The method of claim 16, wherein the one or more reactants endothermically react downhole.

19. A wellbore servicing fluid comprising: an ester-based fluid that is capable of setting upon being cooled by a predetermined amount wherein the predetermined amount is in a range of from about 10° F. to about 20° F. below a maximum temperature of the ester-based fluid in a wellbore and wherein the ester-based fluid comprises a hydraulic cemet.

20. The wellbore servicing fluid of claim 19, being capable of setting in a wellbore having a maximum temperature of less than about 240° F.

21. The wellbore servicing fluid of claim 19, being capable of being used in a wellbore as a spotting fluid, a sealant, or combinations thereof.

22. The wellbore servicing fluid of claim 19, wherein the ester-based fluid comprises an emulsion comprising water in an ester-based oil.

23. The wellbore servicing fluid of claim 22, wherein the ester-based oil comprises esters of monofunctional alcohols comprising 2 to 12 carbons, esters derived from mono or polyunsaturated fatty acids having 16 to 24 carbons, ester blends comprising isomerized and/or internal olefins, or combinations thereof.

24. The settable wellbore servicing fluid of claim 22, wherein the ester-based fluid comprises a pH controlling additive in the water-phase for raising the pH of the ester-based oil when the ester-based fluid is cooled.

25. The settable wellbore servicing fluid of claim 24, wherein the pH controlling additive comprises hydrated lime, soda ash, caustic soda, or combinations thereof.

26. The settable wellbore servicing fluid of claim 22, wherein the ester-based fluid comprises an emulsifer in the water-phase.

27. The settable wellbore servicing fluid of claim 19, wherein the ester-based fluid comprises a weighting agent.

28. A wellbore servicing fluid comprising: an ester-based fluid that is capable of setting upon being cooled by a predetermined amount wherein the ester-based fluid comprises one or more reactants for cooling the fluid via an endothermic reaction.

29. The settable wellbore servicing fluid of claim 28, wherein the one or more reactants comprise barium hydroxide octahydrate and ammonium nitrate.

30. A method of servicing a wellbore in contact with a subterranean formation, comprising:
   (a) passing an ester-based fluid into the wellbore; and
   (b) raising the pH of the ester-based fluid by an effective amount to cause the ester-based fluid to set.

31. The method of claim 30, wherein the pH is raised by cooling the ester-based fluid.

32. The method of claim 31, wherein a temperature of the ester-based fluid is lowered by from about 10° F. to about 20° F.

33. The method of claim 31, wherein the ester-based fluid comprises an emulsion comprising water in an ester-based oil.

34. The method of claim 33, wherein said cooling destabilizes the emulsion.

35. The method of claim 34, wherein the destabilization releases a pH controlling additive, thereby raising the pH in step (b).

* * * * *